(12) United States Patent
Baucom et al.

(10) Patent No.: US 10,338,331 B2
(45) Date of Patent: Jul. 2, 2019

(54) FIBER OPTIC RIBBON CABLE HAVING ENHANCED RIBBON STACK COUPLING AND METHODS THEREOF

(71) Applicant: CORNING OPTICAL COMMUNICATIONS LLC, Hickory, NC (US)

(72) Inventors: James Lee Baucom, Conover, NC (US); William Welch McCollough, Cramerton, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 16/222,417

(22) Filed: Dec. 17, 2018

(65) Prior Publication Data

US 2019/0121043 A1    Apr. 25, 2019

Related U.S. Application Data

(63) Continuation of application No. 15/972,692, filed on May 7, 2018, now Pat. No. 10,180,552, which is a
(Continued)

(51) Int. Cl.
*G02B 6/44* (2006.01)

(52) U.S. Cl.
CPC .............. *G02B 6/4404* (2013.01); *G02B 6/44* (2013.01); *G02B 6/443* (2013.01); *G02B 6/448* (2013.01);
(Continued)

(58) Field of Classification Search
None
See application file for complete search history.

(56) References Cited

U.S. PATENT DOCUMENTS

| 4,232,935 A | 11/1980 | Rohner et al. |
| 4,909,592 A | 3/1990 | Arroyo et al. |

(Continued)

FOREIGN PATENT DOCUMENTS

| EP | 1085357 A2 | 3/2001 |
| JP | 11258472 A | 9/1999 |
| WO | 2009002448 A1 | 12/2008 |

OTHER PUBLICATIONS

AU2012315847 Examination Report dated Jan. 15, 2015.
(Continued)

*Primary Examiner* — Jerry Rahll
(74) *Attorney, Agent, or Firm* — William D. Doyle

(57) ABSTRACT

A fiber optic ribbon cable includes a jacket of the cable, the jacket having a cavity defined therein, an optical element including an optical fiber and extending within the cavity of the jacket, and a dry water-blocking element extending along the optical element within the cavity. The dry water-blocking element is wrapped around the optical element with at least a portion of the dry water-blocking element disposed between another portion of the dry water-blocking element and the optical element, thereby defining an overlapping portion of the dry water-blocking element. The optical element interfaces with the overlapping portion to provide direct or indirect coupling between the optical element and the jacket.

10 Claims, 13 Drawing Sheets

Related U.S. Application Data continuation of application No. 15/410,104, filed on Jan. 19, 2017, now Pat. No. 9,964,724, which is a continuation of application No. 14/863,721, filed on Sep. 24, 2015, now Pat. No. 9,594,224, which is a continuation of application No. 13/625,052, filed on Sep. 24, 2012, now Pat. No. 9,170,388.

(60) Provisional application No. 61/541,142, filed on Sep. 30, 2011.

(52) U.S. Cl.
CPC ....... *G02B 6/4494* (2013.01); *Y10T 29/49924* (2015.01)

(56) References Cited

U.S. PATENT DOCUMENTS

| | | | |
|---|---|---|---|
| 5,133,034 A | 7/1992 | Arroyo et al. | |
| 5,305,410 A | 4/1994 | Arroyo | |
| 5,630,003 A | 5/1997 | Arroyo | |
| 5,906,952 A | 5/1999 | Everaere et al. | |
| 6,052,502 A | 4/2000 | Coleman | |
| 6,160,939 A | 12/2000 | Sheu | |
| 6,236,790 B1 | 5/2001 | Okada et al. | |
| 6,278,826 B1 | 8/2001 | Sheu | |
| 6,594,427 B1 | 7/2003 | Dixon et al. | |
| 6,631,229 B1 | 10/2003 | Norris et al. | |
| 6,704,482 B2 | 3/2004 | Okada et al. | |
| 6,760,523 B2 | 7/2004 | Nechitailo | |
| 6,778,745 B2 | 8/2004 | Debban, Jr. et al. | |
| 6,847,768 B2 | 1/2005 | Lail et al. | |
| 6,876,798 B2 | 4/2005 | Triplett et al. | |
| 6,931,184 B2 | 8/2005 | Tedder et al. | |
| 6,970,629 B2 * | 11/2005 | Lail | G02B 6/4429 385/100 |
| 7,515,795 B2 | 4/2009 | Overton et al. | |
| 7,567,739 B2 | 7/2009 | Overton et al. | |
| 7,599,589 B2 | 10/2009 | Overton et al. | |
| 7,936,957 B1 | 5/2011 | Puzan et al. | |
| 8,145,022 B2 | 3/2012 | Overton et al. | |
| 8,170,388 B2 | 5/2012 | Schrauwen et al. | |
| 8,195,018 B2 | 6/2012 | Overton et al. | |
| 8,208,873 B2 | 6/2012 | Seidel et al. | |
| 8,229,263 B2 | 7/2012 | Parris et al. | |
| 8,369,668 B1 * | 2/2013 | McNutt | G02B 6/4494 385/109 |
| 8,676,011 B1 | 3/2014 | McNutt et al. | |
| 8,682,123 B2 | 3/2014 | Parris | |
| 9,170,388 B2 | 10/2015 | Baucom et al. | |
| 2004/0047573 A1 * | 3/2004 | Lail | G02B 6/4405 385/111 |
| 2004/0091221 A1 * | 5/2004 | Debban, Jr. | G02B 6/4411 385/114 |
| 2004/0120666 A1 | 6/2004 | Chalk et al. | |
| 2004/0208462 A1 * | 10/2004 | Parsons | G02B 6/4433 385/100 |
| 2004/0240808 A1 | 12/2004 | Rhoney et al. | |
| 2005/0180704 A1 | 8/2005 | Terry et al. | |
| 2005/0213921 A1 | 9/2005 | Mertesdorf et al. | |
| 2007/0019915 A1 * | 1/2007 | Overton | G02B 6/4494 385/100 |
| 2007/0269172 A1 | 11/2007 | Parsons et al. | |
| 2008/0145010 A1 | 6/2008 | Overton et al. | |
| 2008/0181564 A1 * | 7/2008 | Overton | G02B 6/4494 385/109 |
| 2009/0003779 A1 * | 1/2009 | Parris | G02B 6/4403 385/103 |
| 2009/0279833 A1 | 11/2009 | Overton et al. | |
| 2010/0303431 A1 | 12/2010 | Cox et al. | |
| 2011/0116753 A1 | 5/2011 | Overton et al. | |
| 2011/0293230 A1 | 12/2011 | Wells et al. | |
| 2012/0014562 A1 | 1/2012 | Berkovich et al. | |
| 2012/0014652 A1 | 1/2012 | Parris | |
| 2012/0120389 A1 | 5/2012 | Logan et al. | |
| 2013/0084047 A1 | 4/2013 | Baucom et al. | |
| 2014/0199037 A1 | 7/2014 | Hurley et al. | |
| 2014/0369656 A1 | 12/2014 | Gimblet et al. | |
| 2015/0268428 A1 | 9/2015 | Baucom et al. | |
| 2015/0268429 A1 | 9/2015 | Baucom et al. | |
| 2016/0018613 A1 | 1/2016 | Baucom et al. | |

OTHER PUBLICATIONS

English Translation of CN201280045423.4 First Office Action dated Aug. 15, 2016, Chinese Patent Office.
IN1592/DELNP/2014 Office Action dated Jan. 24, 2018, India Patent Office.
International Search Report of the International Searching Authority; PCT/US2012/057789; dated Dec. 21, 2012; European Patent Office.
Norris et al; "Dry Central Tube Ribbon Cables for the Outside Plant Environment"; 2014; Proceedings of the 56TH IWCS; p. 202 - 210.
Norris et al; "The Validity of Emerging Test Techiques for the Evolving Outside Plant Cable Design"; Proceedings of the 56TH IWCS; 2007; p. 555 - 560.
Temple et al; "Update: Gel-Free Outside Plant Fiber-Optic Cable Performance Results in Special Testing"; Proceedings of the 56TH IWCS; 2007; p. 561 - 566.
Van Vickle et al; "Central Tube Cable Ribbon Coating"; 2008; Proceedings of the 57TH IWCS; p. 498 - 503.
English Translation of CN201710212713.8 First Office Action dated Mar. 11, 2019, China Patent Office, 8 pgs.

* cited by examiner

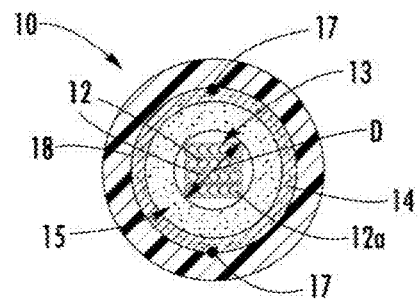
FIG. 3
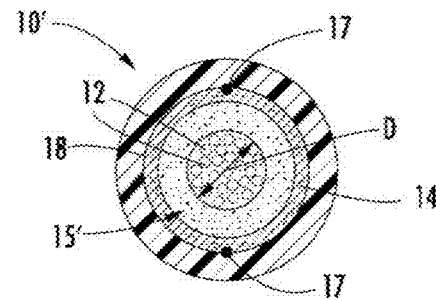
FIG. 3a
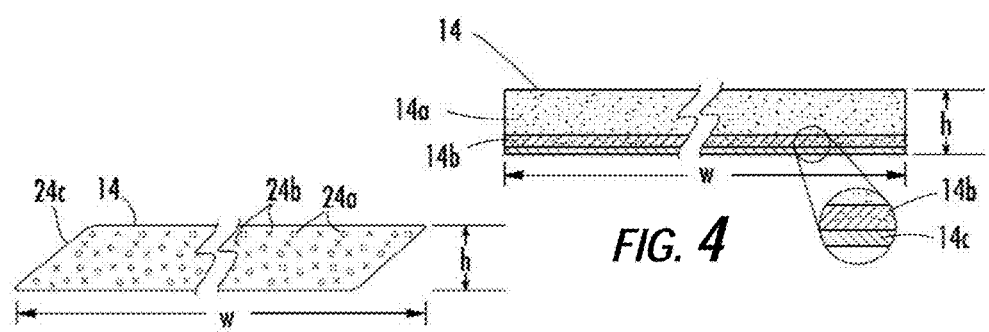
FIG. 4a
FIG. 4
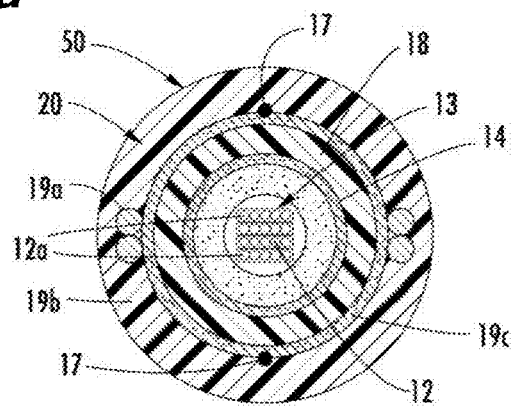
FIG. 7

FIBER OPTIC RIBBON CABLE HAVING ENHANCED RIBBON STACK COUPLING AND METHODS THEREOF

CROSS-REFERENCE

This application is a continuation of U.S. patent application Ser. No. 15/972,692, filed on May 7, 2018, which is a continuation of U.S. patent application Ser. No. 15/410,104, filed on Jan. 19, 2017, which is a continuation of U.S. patent application Ser. No. 14/863,721, filed on Sep. 24, 2015, now U.S. Pat. No. 9,594,224, which is a continuation of U.S. patent application Ser. No. 13/625,052, filed on Sep. 24, 2012, now U.S. Pat. No. 9,170,388, which claims the benefit of priority to U.S. Provisional Application Ser. No. 61/541,142, filed on Sep. 30, 2011, the content of each of which is relied upon and incorporated herein by reference in its entirety. The benefit of priority under 35 U.S.C. § 120 is hereby claimed.

BACKGROUND

Field of the Disclosure

The present disclosure relates generally to fiber optic cables. More specifically, the disclosure relates to a dry fiber optic ribbon cable that includes an overlapping tape for protecting at least one fiber optic ribbon stack and providing a ribbon coupling force.

Technical Field

Fiber optic cables include optical waveguides such as optical fibers that transmit optical signals, for example, voice, video, and/or data information. One type of fiber optic cable configuration includes an optical waveguide disposed within a tube, thereby forming a tube assembly. Generally speaking, the tube protects the optical waveguide; however, the optical waveguide must be further protected within the tube. For instance, the optical waveguide should have some relative movement between the optical waveguide and the tube to accommodate bending. On the other hand, the optical waveguide should be adequately coupled with the tube, thereby inhibiting the optical waveguide from being displaced within the tube when, for example, pulling forces are applied to install the cable. Additionally, the tube assembly should inhibit the migration of water therein. Moreover, the tube assembly should be able to operate over a range of temperatures without undue optical performance degradation.

Some optical tube assemblies meet these requirements by filling the tube with a thixotropic material such as grease 1 (FIG. 1). Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures and the thixotropic materials may cause optical attenuation at relatively low temperatures.

Cable designs have attempted to eliminate thixotropic materials from the tube, but the designs are generally inadequate because they do not meet all of the requirements and/or are expensive to manufacture. One example that eliminates the thixotropic material from the tube is U.S. Pat. No. 4,909,592, which discloses a tube having water-swellable tapes 2 (FIG. 2) and/or yarns disposed therein, where the water-swellable tapes 2 relatively thin and do not fill the space inside a buffer tube. Consequently, the water-swellable tapes may not provide adequate coupling for the optical waveguides because of the unfilled space. Additionally, the space may allow water within the tube to migrate along the tube, rather than be contained by the water-swellable tape. Thus, such a design may require a large number of water-swellable components within the tube for adequately coupling the optical fibers with the tube, which is not economical because it increases the manufacturing complexity along with the cost of the cable.

Another example that eliminates the thixotropic material from a fiber optic cable is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

No admission is made that any reference cited herein constitutes prior art. Applicant expressly reserves the right to challenge the accuracy and pertinence of any cited documents.

SUMMARY

One aspect of the disclosure relates to a fiber optic ribbon cable that includes a jacket of the cable, the jacket having a cavity defined therein, an optical element including an optical fiber and extending within the cavity of the jacket, and a dry water-blocking element extending along the optical element within the cavity. The dry water-blocking element is wrapped around the optical element with at least a portion of the dry water-blocking element disposed between another portion of the dry water-blocking element and the optical element, thereby defining an overlapping portion of the dry water-blocking element. The optical element interfaces with the overlapping portion to provide direct or indirect coupling between the optical element and the jacket.

An aspect of the disclosure relates to a fiber optic ribbon cable, having a jacket and a buffer tube disposed in the jacket, the buffer tube having an average inner width, an average inner perimeter length and an average cross-sectional inner area. A fiber optic ribbon stack may extend longitudinally within the buffer tube, the ribbon stack having an average cross sectional ribbon area, the inner area and the ribbon area defining a ratio of about 0.30 or greater. The ribbon cable further may include an elongated tape extending along the ribbon stack, the elongated tape wrapping around the ribbon stack with at least a portion of one opposing edge tucking between the other opposing edge and the ribbon stack, defining an overlapping portion, the overlapping portion being at least 45 degrees.

In another aspect of the disclosure, the fiber optic ribbon cable may include an overlapping portion of from about 90 degrees to about 130 degrees, and in yet other embodiments the overlapping portion may be about 130 degrees. The overlapping portion may extend along the ribbon stack at least one meter.

In another aspect of the disclosure, the ribbon stack may be coupled to the fiber optic ribbon cable, having a coupling force of at least 0.39 Newtons per meter over a 30 meter length of cable. In some embodiments, the coupling force may be up to about 2.25 Newtons per meter over a 30 meter length of cable.

Another aspect of the disclosure provides for a method of manufacturing a fiber optic ribbon cable, including paying off a plurality of optical fiber ribbons; paying off at least one elongated tape; placing the elongated tape around the plurality of optical fiber ribbons so that the elongated tape wraps around the ribbon stack with at least a portion of one opposing edge tucking between the other opposing edge and the ribbon stack, defining an overlapping portion of at least 45 degrees, the overlapping portion at least partially surrounding the plurality of optical fiber ribbons, forming a core; extruding a buffer tube around the core; and extruding a cable jacket around the buffer tube.

Another aspect of the disclosure provides for a method of inducing a coupling force in a fiber optic ribbon cable, including providing a fiber optic ribbon stack, the ribbon stack having an induced helical twist; providing an elongated tape along the fiber optic ribbon stack; placing the elongated tape around the fiber optic ribbon stack, forming a core; creating an overlapping portion of the elongated tape, the overlapping portion at least partially surrounding the fiber optic ribbon stack, the section of the cable comprising at least three layers of the elongated tape extending along the ribbon stack due to the overlapping portion; extruding a buffer tube around the core, the buffer tube comprising a polymer extruded in a molten state; cooling the buffer tube, the cooling buffer tube contracting during cooling, inducing a coupling force between the ribbon stack, the elongated tape, the overlapping portion and the buffer tube of about 0.39 N/m or greater; and extruding a jacket around the buffer tube.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 3 is a cross-sectional view of a tube assembly according to the present disclosure;

FIG. 3a is a cross-sectional view of another tube assembly according to the present disclosure:

FIG. 4 is a cross-sectional view of the dry insert of the tube assembly of FIG. 3;

FIG. 4a is a cross-sectional view of another dry insert according to the present disclosure;

FIGS. 5 and 5a are cross-sectional views of tube assemblies according to the present disclosure having the dry insert of FIG. 4a;

FIG. 7 is a cross-sectional view of a fiber optic cable according to the present disclosure using the tube assembly of FIG. 3;

DETAILED DESCRIPTION

Figure 1:
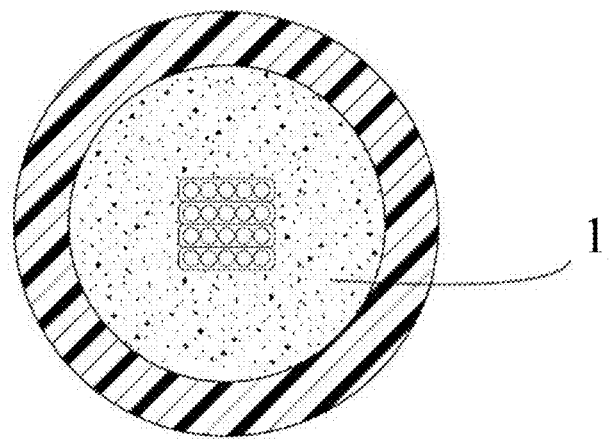
FIG. 1 is a cross-sectional view of a fiber optic cable having a conventional grease filled tube assembly.
Figure 2:
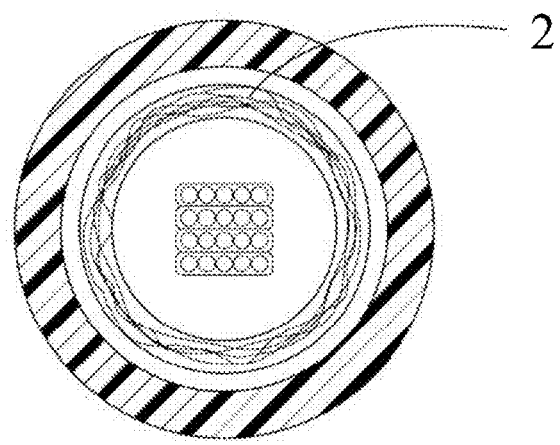
FIG. 2 is a cross-sectional view of a fiber optic cable having a conventional dry tube assembly.

The present disclosure will now be described more fully hereinafter with reference to the accompanying drawings showing preferred embodiments of the disclosure. The disclosure may, however, be embodied in many different forms and should not be construed as limited to the embodiments set forth herein; rather, these embodiments are provided so that the disclosure will fully convey the scope of the disclosure to those skilled in the art. The drawings are not necessarily drawn to scale but are configured to clearly illustrate the disclosure.

Illustrated in FIG. 3 is an exemplary tube assembly 10 according to one aspect of the present disclosure. Tube assembly 10 includes at least one optical waveguide 12, at least one dry insert 14, and a tube 18. In this case, the at least one optical waveguide 12 is in the form of a stack of ribbons 13 having a diagonal D dimension across the corners of the stack. Dry insert 14 generally surrounds the at least one optical waveguide 12 and forms core 15, which is disposed within tube 18. Dry insert 14 performs functions such as cushioning, coupling, inhibiting the migration of water, and accommodates bending. Dry insert 14 is advantageous because the optical waveguides are easily removed therefrom without leaving a residue or film that requires cleaning before connectorization. Moreover, unlike conventional thixotropic materials, dry insert 14 does not change viscosity with temperature variations or have a propensity to drip from an end of the tube at high temperatures. Furthermore, tube assembly 10 can include other suitable components such as a polyester binder thread 17 to hold dry insert 14 about optical waveguide 12. Likewise, two or more threads may be stitched together for holding dry insert 14 together before extruding tube 18 therearound. FIG. 3a shows tube assembly 10', which is a variation of tube assembly 10. Specifically, tube assembly 10' includes a plurality of loose optical waveguides 12, instead of the stack of ribbons 13. In this case, tube assembly 10' includes twenty-four loose optical waveguides 12 having diagonal dimension D, but any suitable number of optical waveguides may be used. Moreover, optical waveguides 12 may be bundled into one or more groups using binders, water-swellable threads, tapes, wraps, or other suitable materials. Additionally, tube assemblies 10 or 10' can be a portion of cable as shown in FIG. 7. Furthermore, dry inserts 14 according to the present disclosure may be used with tubeless cable designs.

As depicted, optical waveguide 12 is an optical fiber that forms a portion of an optical fiber ribbon. In this case, the optical waveguides are a plurality of single-mode optical fibers in a ribbon format that form ribbon stack 13. Ribbon stack 13 can include helical or S-Z stranding. Additionally, other types or configurations of optical waveguides can be used. For example, optical waveguide 12 can be multi-mode, pure-mode, erbium doped, polarization-maintaining fiber, other suitable types of light waveguides, and/or combinations thereof. Moreover, optical waveguide 12 can be loose or in bundles. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003, the disclosure of which is incorporated herein by reference. Optical waveguide 12 can also include an identifiing means such as ink or other suitable indicia for identification. Suitable optical fibers are commercially available from Corning Incorporated of Corning, N.Y.

In other embodiments, ribbon stack 13 can have a corner optical waveguide(s) 12a with a predetermined MAC number, thereby inhibiting optical attenuation of the corner optical waveguide when subjected to compressive forces. Stated another way, selecting corner optical waveguides with a predetermined MAC number places optical waveguides that are less sensitive to optical attenuation from compressive forces in ribbon stack locations that experience relatively high levels of compression. As used herein. MAC number is calculated as a mode field diameter (MFD) divided by a cutoff wavelength for the given optical waveguide 12a where both quantities are expressed in micrometers so that the MAC number is dimensionless. In other words, MFD is typically expressed in micrometers and cutoff wavelength is typically expressed in nanometers, so the cutoff wavelength must be divided by 1000 to convert it to micrometers, thereby yielding a dimensionless MAC number.

In one embodiment, one or more of the corner optical waveguides 12a have a predetermined MAC number. Specifically, the MAC number is about 7.35 or less, more preferably about 7.00 or less, and most preferably about 6.85 or less. By way of example, corner optical waveguide(s) 12a is selected with a MFD of 9.11 μm or less and a cutoff wavelength of 1240 nm or more, thereby yielding 7.35 or less for the MAC number. Generally speaking, the MAC number is directly proportional to MFD and inversely proportional to the cutoff wavelength. Ribbon stack 13 has four corner optical waveguides 12a; however, other ribbon stack configurations can include more corner positions. For instance, a ribbon stack having a generally plus sign shape includes eight outer corners. Likewise, other ribbon stack configurations may have other numbers of corner positions.

Additionally, ribbon embodiments of the present disclosure may have a positive excess ribbon length (ERL), although a negative ERL is possible. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, ribbons of the cable have a positive ERL, preferably a positive ERL in the range of about 0.0% to about 0.2% or greater. Likewise, embodiments having loose or bundled optical fibers may include a positive excess fiber length (EFL).

FIGS. 4 and 4a illustrate cross-sectional views of explanatory dry inserts 14 according to the present disclosure. Dry inserts 14 are formed from an elongate material or materials that are capable of being paid off from a reel for a continuous application during manufacture. Dry inserts 14 may be formed from a plurality of layers (FIG. 4) that can perform different functions; however, dry insert 14 (FIG. 4a) can also be a single layer such as a felt material that is compressible. Dry insert 14 cushions optical waveguide 12 from tube 18, thereby maintaining optical attenuation of optical waveguide 12 below about 0.4 dB/km at a reference wavelength of 1310 nm and 0.3 dB/km at a reference wavelengths of 1550 nm and 1625 nm. In one embodiment, dry insert 14 is formed from two distinct layers and/or materials. For instance, FIG. 4 depicts a first layer 14a of dry insert 14 that is a compressible layer and second layer 14b that is a water-swellable layer. In this case, first layer 14a is formed from a compressible material having a predetermined spring constant for providing adequate coupling characteristics. By way of example, the first layer is a foam tape, preferably, an open cell foam tape, however, any suitable compressible material can be used such as a closed cell foam tape. Second layer 14b is a water-swellable layer such as a tape having a water-swellable powder that inhibits the migration of water within tube 18. Additionally, single layer dry inserts according to the present disclosure can have similar characteristics.

FIG. 4a depicts another dry insert 14 having a single, non-woven layer of felt made of one or more materials. In this case, dry insert 14 comprises a plurality of water-swellable filaments 24a along with other filaments 24b that are non-swellable in water, thereby forming a layer of felt having multiple materials. As used herein, felt means a material comprising one or more types of non-continuous filaments and/or fibers which have been caused to adhere and mat together through the action of heat, moisture, chemicals, pressure, or a combination of the foregoing actions, thereby forming a relatively thick and compressible layer. Water-swellable filaments 24a may comprise any suitable water-swellable material, but preferably include at least one superabsorbant polymer. Preferred superabsorbent polymers are partially cross-linked polymers that absorb many times their own weight in water and swell considerably without dissolving, for example, acrylate, urethane or cellulosic-based materials. By way of example, the single layer dry insert 14 of FIG. 4a may include about 25% or less by weight of water-swellable filaments 24a and about 75% or more by weight of other filaments 24b; however, other suitable ratios are possible. Likewise, in this configuration the density of the dry insert can be influenced to meet the needs of the tube assembly. Generally speaking, the single layer felt dry insert is a compressible layer for cushioning and coupling of the optical fibers and may include water-swellable materials for inhibiting the migration of water. Unlike some water-swellable tapes the single layer felt has a relatively large thickness that generally speaking fills spaces within the tube or cavity. Moreover, the felt dry insert may use water-swellable filaments that aid in providing compressibility or fluffiness of the dry insert, rather than water-swellable powders that are used in other water-swellable tapes.

Figure 4B:
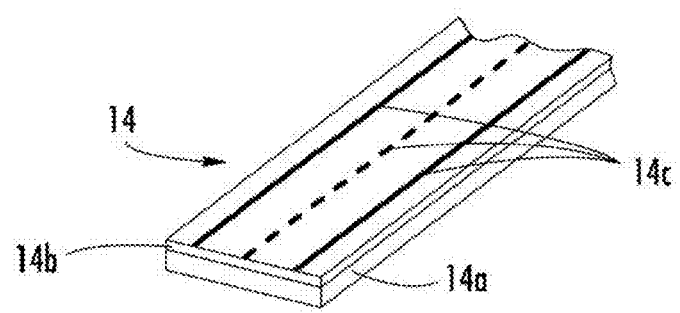
FIGS. 4b-4d depict various configurations of an adhesive/glue applied to the dry insert of FIG. 4.
Figure 4C:
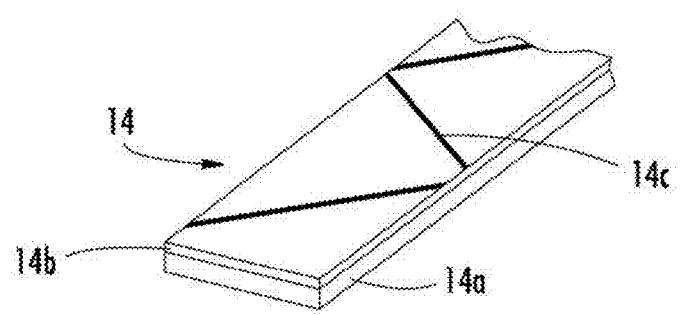
Figure 4D:
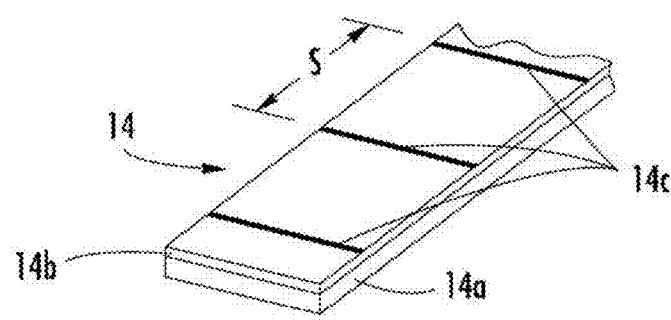

Other filaments 24b may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 24b and may be tailored for providing specific characteristics. For instance, polymer filaments can be used for coupling the dry insert with the tube when the same is extruded thereover. In other words, the hot tube extrudate at least partially melts the polymer filaments, thereby causing adhesion between the two. Another example is that elastomeric fibers can be included in the dry insert for providing improved coupling of optical waveguide 12 with tube 18. The use of elastomeric fibers, or other suitable material, may allow for the coupling of dry insert 14 to tube 18, and/or optical waveguide 12 to dry insert 14 by increasing a coefficient of friction. Of course, as depicted in FIGS. 4b-4d adhesives, glues, (FIGS. 4b-4d) or other methods may be used for attaching the dry insert to the tube. Furthermore, the dry insert may include other chemicals or additives to influence properties such as flame-retardance.

Figure 5:
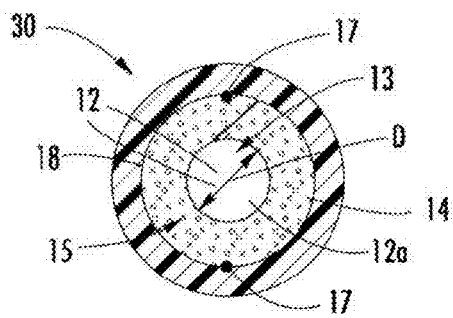
Figure 5A:
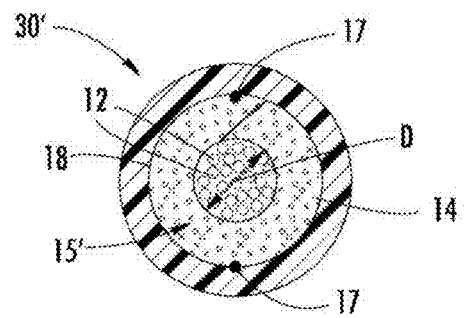
Figure 8:
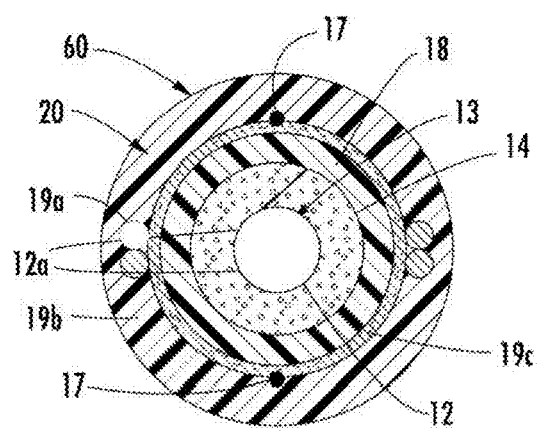
FIG. 8 is a cross-sectional view of a fiber optic cable according to the present disclosure using the tube assembly of FIG. 5.

FIGS. 5 and 5a depict tube assemblies 30 and 30' that are similar to tube assemblies 10 and 10' depicted in FIGS. 3 and 3a, except they employ the dry insert of FIG. 4a. Furthermore, tube assemblies 30 and 30' can be included as a portion of a fiber optic cable 60 as depicted in FIG. 8. Dry insert 14 of FIG. 4a advantageously performs the functions of cushioning, coupling, inhibiting the migration of water, and accommodates bending like the multi-layer dry insert. Additionally, the single layer construction may reduce costs and improve cable manufacturability.

Figure 16:
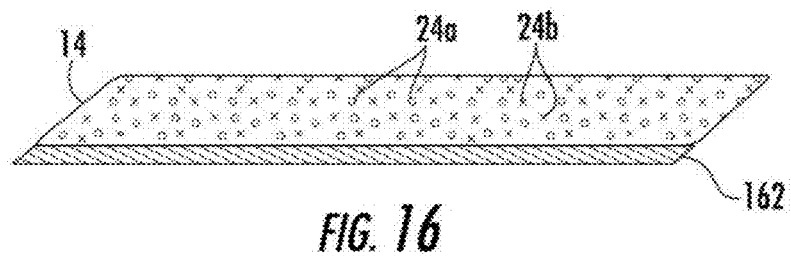
FIG. 16 is a cross-sectional view of the dry insert of FIG. 4a having an additional layer.

Additionally, the dry insert of FIG. 4a can include one or more other layers in addition to the felt for tailoring performance characteristics. Illustratively, FIG. 16 depicts another dry insert 14 having a second layer 162 attached to one side of the felt dry insert of FIG. 4a. Using a second layer attached to the felt dry insert allows for several different dry insert configurations. For instance, the felt dry insert may exclude water-swellable filaments, and instead second layer 162 is a water-swellable tape that inhibits the migration of water. In another embodiment, the felt includes water-swellable filaments and a water-swellable tape attached thereto. In a further embodiment, second layer 162 is a meltable layer having a polymer that at least partially melts during extrusion of the tube thereover. Likewise, other dry insert embodiments are possible.

Figure 17:
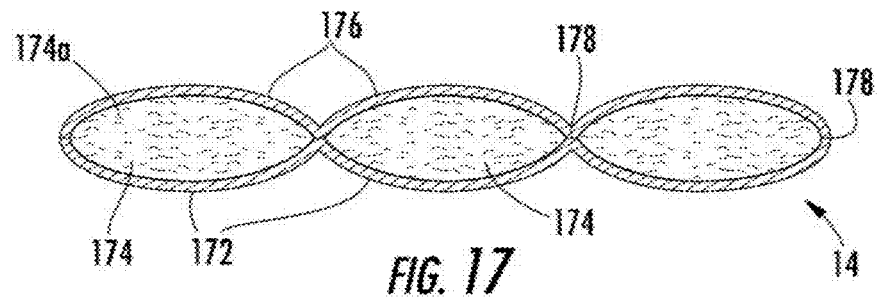
FIG. 17 is a cross-sectional view of still another embodiment of the dry insert according to the present disclosure.
Figure 18:
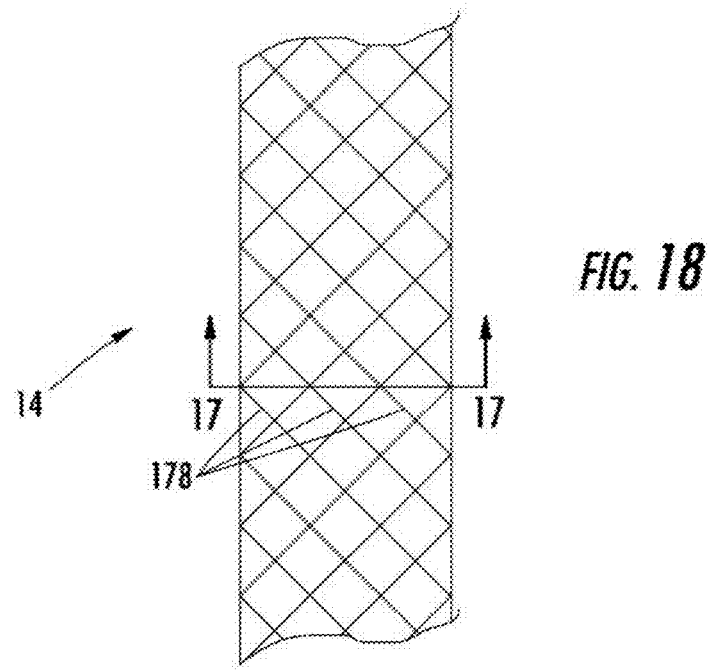
FIG. 18 is a plan view of the dry insert of FIG. 17.

Illustratively, FIGS. 17 and 18 depict dry insert 14 having a first and a second layer 172,176 with at least one water-swellable layer 174 disposed in a compartment 174a therebetween. In other words, water-swellable layer 174 is generally contained in one or more compartments 174a between first and second layers 172,176 that act as backing layers. By way of example, first and second layers may be formed of nylon, polymers, fiberglass, aramid, w-s tape, composite materials, or any other suitable materials in a tape-like configuration. Materials for this configuration should provide the necessary strength to endure the cabling process and intended use. Additionally, at least one of the first and/or second layers should be porous for water penetration. Preferably, water-swellable layer 174 includes non-continuous water-swellable filaments loosely disposed between first and second layers 172,174, thereby forming a compressible dry insert. Suitable water-swellable filaments are, for example, LANSEAL materials available from Toyobo of Osaka, Japan or OASIS materials available from Technical Absorbents Ltd. of South Humberside, United Kingdom. Additionally, water-swellable layer 174 may comprise a water swellable powder along with the water swellable filaments. Moreover, water-swellable layer 174 may include other filaments as a filler to increase the thickness of the water swellable layer and thus of the dry insert, while reducing the cost of the dry insert. The other filaments may comprise any suitable non-swellable as discussed herein.

Furthermore, first and second layers 172,176 are attached together so that water-swellable layer 174 is generally sandwiched therebetween, thereby creating one or more compartments 174a, which generally speaking traps water-swellable layer 174 therein. At a minimum, layers 172,176 are attached together at a plurality of seams 178 along the longitudinal edges, but are attachable in other ways. Layers 172,176 are attachable using adhesives, heat where appropriate, stitching, or other suitable methods. In preferred embodiments, layers 172,176 are attached at intermediate positions along the length of the dry insert. As shown in FIG. 18, layers 172,176 are attached together using a diamond pattern of seams 178; however, other suitable patterns such as triangular, semi-circular, or curvilinear patterns are possible, thereby creating the plurality of compartments 174a. Additionally, the seams between compartments can be arranged for aiding in forming the dry insert about the optical waveguides. Compartmentalization of water-swellable layer 174 advantageously inhibits moving or shifting of the material beyond the individual compartment. Moreover, the compartments add a pillowy texture to the dry insert.

In further embodiments, first and second layers 172,176 need not comprise the same material. In other words, the materials of the first and second layers may be selected to tailor the dry insert behavior according to the needs of each side of the dry insert. For instance, the first layer is tailored to adhere with the extruded tube and the second layer is tailored to have a smooth finish for contact with the optical waveguides. Additionally, in other embodiments the dry insert can have more than a first and second layers to, for instance, optimize the attachment of the layers, coupling, and/or inhibit water migration. However, the dry insert should not be so stiff that it is too difficult to manufacture into a cable assembly. Additionally, as shown in FIG. 4a it may be advantageous for one of the longitudinal edges of any of the dry inserts to have a tapered edges 24c so that the longitudinal edges may overlap without a large bulge when the dry insert is formed about the at least on optical fiber 12.

Dry inserts 14 of the present disclosure preferably have a water-swell speed so that the majority of swell height of the water-swellable substance occurs within about 120 seconds or less of being exposed to water, more preferably about 90 seconds or less. Additionally, dry inserts 14 preferably has a maximum swell height of about 18 mm for distilled water and about 8 mm for a 5% ionic water solution, i.e., salt water; however, dry inserts with other suitable maximum swell heights may be used.

Figure 12:
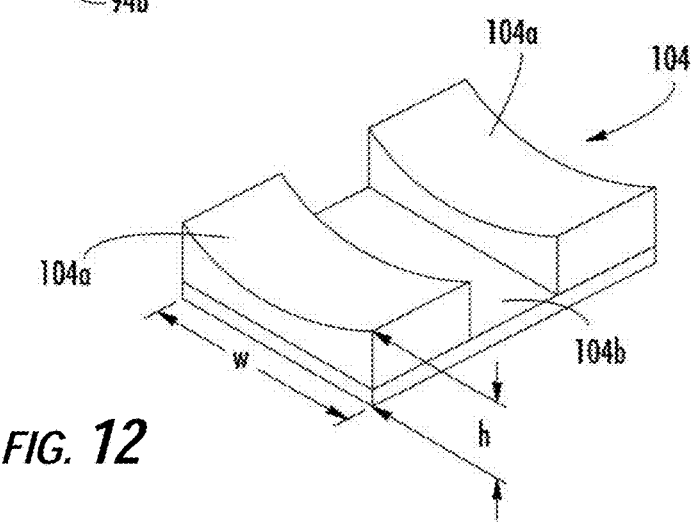
FIG. 12 is a perspective view of another dry insert according to the concepts of the present disclosure.

Dry inserts 14 may be compressed during assembly so that it provides a predetermined normal force that inhibits optical waveguide 12 from being easily displaced longitudinally along tube 18. Dry inserts 14 preferably have an uncompressed height h of about 5 mm or less for minimizing the tube diameter and/or cable diameter; however, any suitable height h can be used for dry inserts 14. By way of example, a single layer dry insert 14 can have an uncompressed height in the range of about 0.5 mm to about 2 mm, thereby resulting in a tube assembly having a relatively small diameter. Moreover, height h of dry insert 14 need not be constant across the width, but can vary, thereby conforming to the cross-sectional shape of the optical waveguides and providing improved cushioning to improve optical performance (FIG. 12). Compression of dry insert 14 is actually a localized maximum compression of dry insert 14. In the case of FIG. 3, the localized maximum compression of dry insert 14 occurs at the corners of the ribbon stack across the diameter. Calculating the percentage of compression of dry insert 14 in FIG. 3 requires knowing an inner diameter of tube 18, a diagonal D dimension of the ribbon stack, and an uncompressed height h of dry insert 14. By way of example, inner diameter of tube 18 is 7.1 mm, diagonal D of the ribbon stack is 5.1 mm, and the uncompressed height h of dry insert 14 across a diameter is 3.0 mm (2 times 1.5 mm). Adding diagonal D (5.1 mm) and the uncompressed height h of dry insert 14 across the diameter (3.0 mm) yields an uncompressed dimension of 8.1 mm. When placing the ribbon stack and dry insert 14 and into tube 18 with an inner diameter of 7.1 mm, dry insert is compressed a total of 1 mm (8.1 mm-7.1 mm). Thus, dr insert 14 is compressed by about thirty percent across the diameter of tube 18. According to the concepts of the present disclosure the compression of dry insert 14 is preferably in the range of about 10% to about 90%; however, other suitable ranges of compression may provide the desired performance. Nonetheless, the compression of dry insert 14 should not be so great as to cause undue optical attenuation in any of the optical waveguides.

In other embodiments, first layer 14a of dry insert 14 is uncompressed in tube assembly 10, but begins to compress if optical waveguide movement is initiated. Other variations include attaching, bonding, or otherwise coupling a portion of dry insert 14 to tube 18. For example, adhesives, glues, elastomers, and/or polymers 14c are disposed on a portion of the surface of dry insert 14 that contacts tube 18 for attaching dry insert 14 to tube 18. Additionally, it is possible to helically wrap dry insert 14 about optical waveguide 12, instead of being longitudinally disposed. In still further embodiments, two or more dry inserts can be formed about one or more optical waveguides 12 such as two halves placed within tube 18.

Other embodiments may include a fugitive glue/adhesive for coupling cable core 15 and/or dry insert 14 with tube 18. The glue/adhesive or the like is applied to the radially outward surface of dry insert 14, for instance, during the manufacturing process. The fugitive glue/adhesive is applied while hot or melted to the outer surface of dry insert 14 and then is cooled or frozen when the cable is quenched or cools off. By way of example, a suitable fugitive glue is available from National Starch and Chemical Company of Bridgewater, N.J. under the tradename LITE-LOK® 70-003A. The fugitive glue or other suitable adhesive/material may be applied in beads having a continuous or an intermittent configuration as shown in FIGS. 4b-4d. For instance, one or more adhesive/glue beads may be longitudinally applied along the dry insert, longitudinally spaced apart beads, in a zig-zag bead along the longitudinal axis of the dry insert, or in any other suitable configuration.

In one application, a plurality of beads of fugitive glue/adhesive or the like is applied to dry insert 14. For instance, three continuous, or non-continuous, beads can be disposed at locations so that when the dry insert is formed about the ribbon stack the beads are about 120 degrees apart. Likewise, four beads can be disposed at locations so they are about 90 degrees apart when the dry insert is formed about the optical waveguides. In embodiments having the beads spaced apart along the longitudinal axis, the beads may have a longitudinal spacing S of about 20 mm and about 800 mm or more; however, other suitable spacing may be used. Additionally, beads may be intermittently applied for minimizing the amount of material required, thereby reducing manufacturing expense while still providing sufficient coupling/adhesion.

Since tube assemblies 10 are not filled with a thixotropic material the tube may deform or collapse, thereby forming an oval shaped tube instead of a round tube. U.S. patent application Ser. No. 10/448,509 filed on May 30, 2003, the disclosure of which is incorporated herein by reference, discusses dry tube assemblies where the tube is formed from a bimodal polymeric material having a predetermined average ovality. As used herein, ovality is the difference between a major diameter D1 and a minor diameter D2 of tube 18 divided by major diameter D1 and multiplied by a factor of one-hundred, thereby expressing ovality as a percentage. Bimodal polymeric materials include materials having at least a first polymer material having a relatively high molecular weight and a second polymer material having a relatively low molecular weight that are manufactured in a dual reactor process. This dual reactor process provides the desired material properties and should not be confused with simple post reactor polymer blends that compromise the properties of both resins in the blend. In one embodiment, the tube has an average ovality of about 10 percent or less. By way of example, tube 18 is formed from a HDPE available from the Dow Chemical Company of Midland, Mich., under the tradename DGDA-2490 NT.

Coupling of the optical waveguide in the tube assembly may be measured using a normalized optical ribbon pullout force test. The ribbon pullout force test measures the force (N/m) required to initiate movement of a ribbon stack from a 10-meter length of cable. Of course, this test is equally applicable to loose or bundled optical waveguides. Specifically, the test measures the force required to initiate movement of a stack of ribbons, or other configurations of optical waveguides, relative to the tube and the force is divided by the length of the cable, thereby normalizing the optical ribbon pullout force. Preferably, the ribbon pullout force is in the range of about 0.5 N/m and about 5.0 N/m, more preferably, in the range of about 1 N/m to about 4 N/m.

Figure 6:
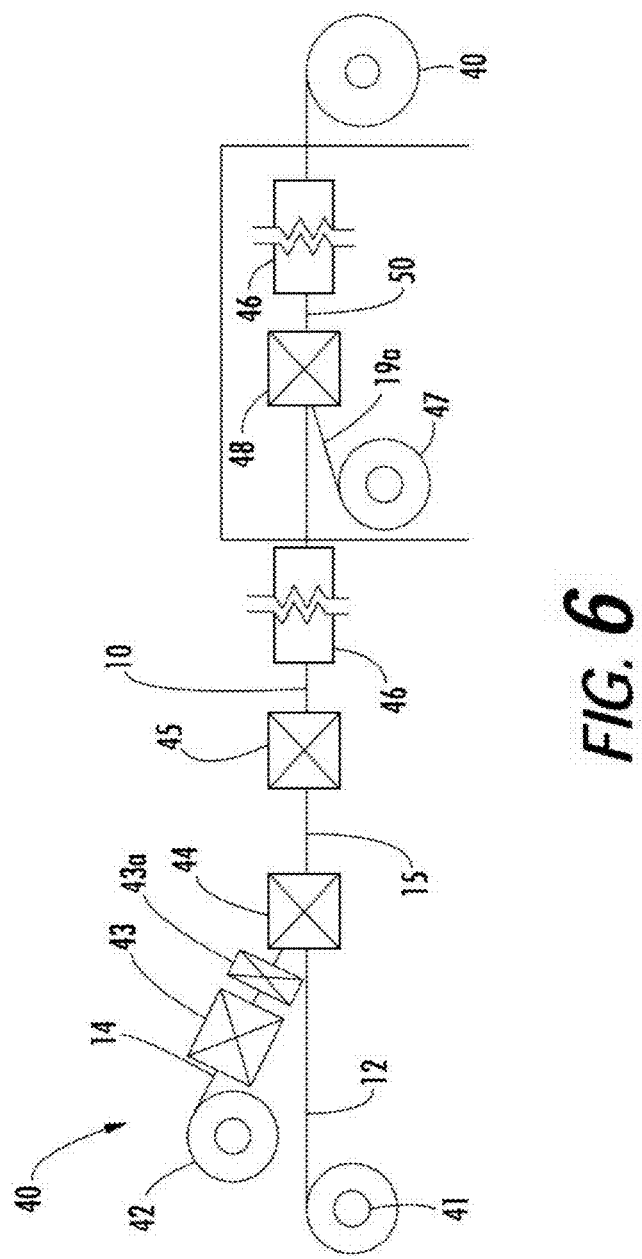
FIG. 6 is a schematic representation of a manufacturing line according to the present disclosure.

FIG. 6 schematically illustrates an exemplary manufacturing line 40 for tube assembly 10 according to the present disclosure. Manufacturing line 40 includes at least one optical waveguide payoff reel 41, a dry insert payoff reel 42, an optional compression station 43, an glueadhesive station 43a, a binding station 44, a cross-head extruder 45, a water trough 46, and a take-up reel 49. Additionally, tube assembly 10 may have a sheath 20 therearound, thereby forming a cable 50 as illustrated in FIG. 7. Sheath 20 can include strength members 19a and a jacket 19b, which can be manufactured on the same line as tube assembly 10 or on a second manufacturing line. The exemplary manufacturing process includes paying-off at least one optical waveguide 12 and dry insert 14 from respective reels 41 and 42. Only one payoff reel for optical waveguide 12 and dry insert 14 are shown for clarity; however, the manufacturing line can include any suitable number of payoff reels to manufacture tube assemblies and cables according to the present disclosure. Next, dry insert 14 is compressed to a predetermined height h at compression station 43 and optionally an adhesive/glue is applied to the outer surface of dry insert 14 at station 43a. Then dry insert 14 is generally positioned around optical waveguide 12 and if desired a binding station wraps or sews one or more binding threads around dry insert 14, thereby forming core 15. Thereafter, core 15 is feed into cross-head extruder 45 where tube 18 is extruded about core 15, thereby forming tube assembly 10. Tube 18 is then quenched in water trough 46 and then tube assembly 10 is wound onto take-up reel 49. As depicted in the dashed box, if one manufacturing line is set-up to make cable 50, then strength members 19a are paid-off reel 47 and positioned adjacent to tube 18, and jacket 19b is extruded about strength members 19a and tube 18 using cross-head extruder 48. Thereafter, cable 50 passes into a second water trough 46 before being wound-up on take-up reel 49. Additionally, other cables and/or manufacturing lines according to the concepts of the present disclosure are possible. For instance, cables and/or manufacturing lines may include a water-swellable tape 19c and/or an armor between tube 18 and strength members 19a; however, the use of other suitable cable components are possible.

Additionally, a ribbon coupling force test may be used for modeling the forces applied to the optical waveguide(s) when subjecting a cable to, for example, pulling during installation of the cable. Although the results between the ribbon pullout force and the ribbon coupling force may have forces in the same general range, the ribbon coupling force is generally a better indicator of actual cable performance.

Specifically, the ribbon coupling test simulates an underground cable installation in a duct by applying 600 pounds of tension on a 250 m length of cable by placing pulling sheaves on the respective sheathes of the cable ends. Like the ribbon pullout test, this test is equally applicable to loose or bundled optical waveguides. However, other suitable loads, lengths, and/or installation configurations can be used for characterizing waveguide coupling in other simulations. Then, the force on the optical waveguide(s) along its length is measured from the end of cable. The force on the optical waveguide(s) is measured using a Brillouin Optical Time-Domain Reflectometer (BOTDR). Determining a best-fit slope of the curve normalizes the ribbon coupling force. Thus, according to the concepts of the present disclosure the coupling force is preferably in the range of about 0.5 N/m to about 5.0 N/m, more preferably, in the range of about 1 N/m to about 4 N/m. However, other suitable ranges of coupling force may provide the desired performance.

Figure 9:
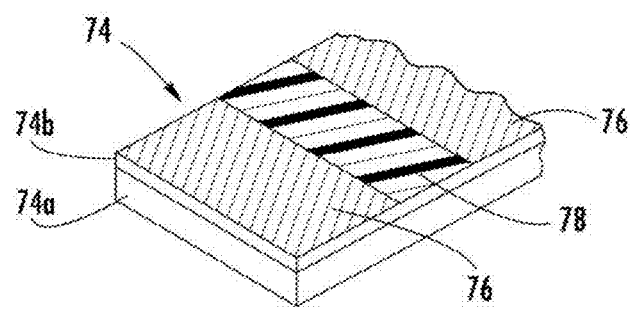
FIG. 9 is a perspective view of another dry insert according to the concepts of the present disclosure.

Additionally, the concepts of the present disclosure can be employed with other configurations of the dry insert. As depicted in FIG. 9, dry insert 74 has a first layer 74a and a second layer 74b that includes different suitable types of water-swellable substances. In one embodiment, two different water-swellable substances are disposed in, or on, second layer 14b so that tube assembly 10 is useful for multiple environments and/or has improved water-blocking performance. For instance, second layer 14b can include a first water-swellable component 76 effective for ionized liquids such as saltwater and a second water-swellable component 78 effective for non-ionized liquids. By way of example, first water-swellable material is a polyacrylamide and second water-swellable material is a polyacrylate superabsorbent. Moreover, first and second water-swellable components 76,78 can occupy predetermined sections of the water-swellable tape. By alternating the water-swellable materials, the tape is useful for standard applications, salt-water applications, or both. Other variations of different water-swellable substances include having a water-swellable substance with different swell speeds, gel strengths and/or adhesion with the tape.

Figure 10:
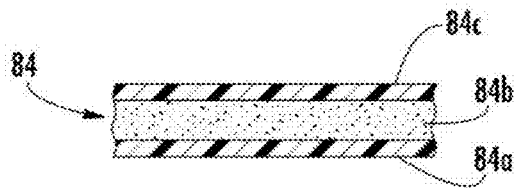
FIG. 10 is a cross-sectional view of another dry insert according to the concepts of the present disclosure.

FIG. 10 depicts another embodiment of the dry insert. Dry insert 84 is formed from three layers. Layers 84a and 84c are water-swellable layers that sandwich a layer 84b that is compressible for providing a coupling force to the at least one optical waveguide. Likewise, other embodiments of the dry insert can include other variations such at least two compressible layers sandwiching a water-swellable layer. The two compressible layers can have different spring constants for tailoring the normal force applied to the at least optical waveguide.

Figure 11:
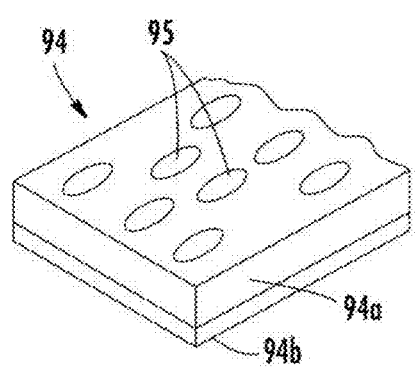
FIG. 11 is a perspective view of another dry insert according to the concepts of the present disclosure.

FIG. 11 illustrates a dry insert 94 having layers 94a and 94b according to another embodiment of the present disclosure. Layer 94a is formed from a closed-cell foam having at least one perforation 95 therethrough and layer 94b includes at least one water-swellable substance; however, other suitable materials can be used for the compressible layer. The closed-cell foam acts as a passive water-blocking material that inhibits water from migrating therealong and perforation 95 allows an activated water-swellable substance of layer 94b to migrate radially inward towards the optical waveguide. Any suitable size, shape, and/or pattern of perforation 95 that allows the activated water-swellable substance to migrate radially inward to effectively block water is permissible. The size, shape, and/or pattern of perforations can be selected and arranged about the corner optical waveguides of the stack, thereby improving corner optical waveguide performance. For example, perforations 95 can provide variation in dry insert compressibility, thereby tailoring the normal force on the optical waveguides for maintaining optical performance.

FIG. 12 depicts dry insert 104, which illustrates other concepts of the present disclosure. Dry insert 104 includes layers 104a and 104b. Layer 104a is formed of a plurality of non-continuous compressible elements that are disposed on layer 104b, which is a continuous water-swellable layer. In one embodiment, the elements of layer 104a are disposed at regular intervals that generally correlate with the lay length of a ribbon stack. Additionally, the elements have a height h that varies across their width w. Stated another way, the elements are shaped to conform to the shape of the optical waveguides they are intended to generally surround.

Figure 13:
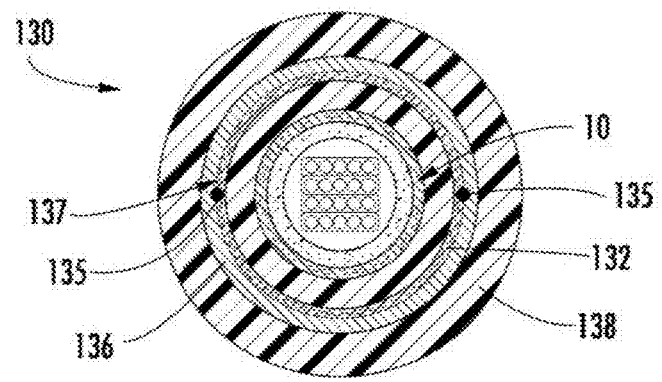
FIG. 13 is a cross-sectional view of a fiber optic cable with an armor layer according to the present disclosure.

FIG. 13 depicts cable 130, which is another embodiment of the present disclosure that employs tube assembly 10. Cable 130 includes a sheath system 137 about tube assembly 10 for protecting tube assembly 10 from, for instance, crushing forces and environmental effects. In this case, sheath system 137 includes a water-swellable tape 132 that is secured by a binder thread (not visible), a pair of ripcords 135, an armor tape 136, and a jacket 138. Armor tape 136 is preferably rolled formed; however, other suitable manufacturing methods may be used. The pair of ripcords 135 are generally disposed about one-hundred and eighty degrees apart with about ninety degree intervals from the armor overlap, thereby inhibiting the shearing of ripcord on an edge of the armor tape during use. In preferred embodiments, ripcords suitable for ripping through an armor tape have a construction as disclosed in U.S. patent application Ser. No. 10/652,046 filed on Aug. 29, 2003, the disclosure of which is incorporated herein by reference. Armor tape 136 can be either a dielectric or a metallic material. If a dielectric armor tape is used the cable may also include a metallic wire for locating the cable in buried applications. In other words, the metallic wire makes the cable tonable. Jacket 138 generally surrounds armor tape 136 and provides environmental protection to cable 130. Of course, other suitable sheath systems may be used about the tube assembly.

Figure 14:
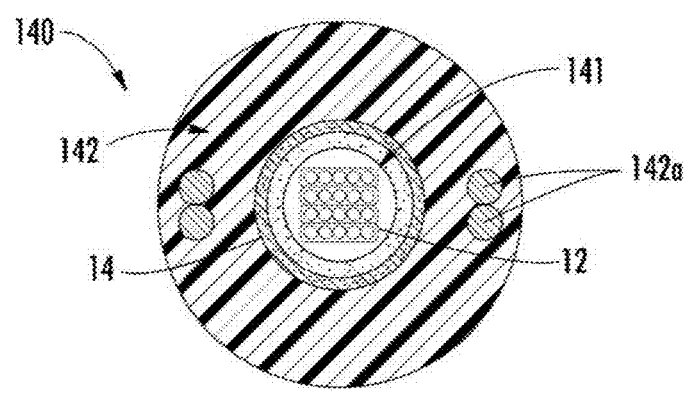
FIG. 14 is a cross-sectional view of a tubeless fiber optic cable according to the present disclosure.

FIG. 14 depicts fiber optic cable 140. Cable 140 includes at least one optical waveguide 12 and a dry insert 14 forming a cable core 141 within a sheath system 142. In other words, cable 140 is a tubeless design since access to the cable core 141 is accomplished by solely cutting open sheath system 142. Sheath system 142 also includes strength members 142a embedded therein and disposed at about 180 degrees apart, thereby imparting a preferential bend to the cable. Of course, other sheath systems configurations such as different types, quantities, and/or placement of strength members 142a are possible. Cable 140 may also include one or more ripcords 145 disposed between cable core 141 and sheath 142 for ripping sheath 142, thereby allowing the craftsman easy access to cable core 141.

Figure 15:
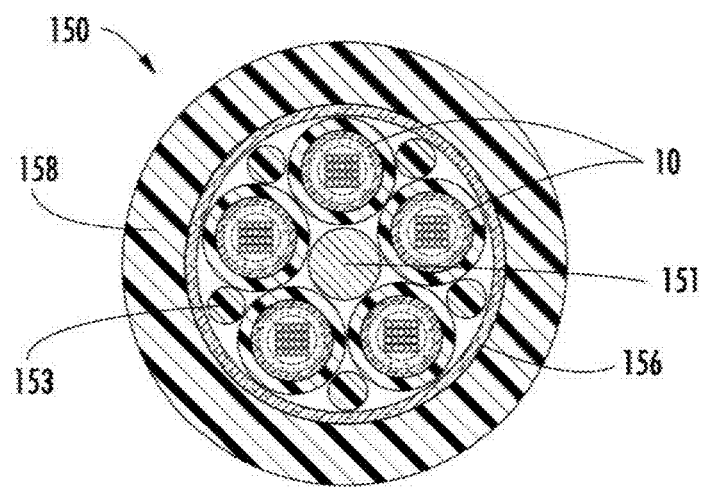
FIG. 15 is a cross-sectional view of a fiber optic cable having stranded tubes according to the present disclosure.

FIG. 15 depicts a fiber optic cable 150 having a plurality of tube assemblies 10 stranded about a central member 151. Specifically, tube assemblies 10 along with a plurality of filler rods 153 are S-Z stranded about central member 151 and are secured with one or more binder threads (not visible), thereby forming a stranded cable core. The stranded cable core has a water-swellable tape 156 thereabout, which is secured with a binder thread (not visible) before jacket 158 is extruded thereover. Optionally, aramid fibers, other suitable strength members and/or water blocking components such as water-swellable yarns may be stranded about central member 151, thereby forming a portion of the stranded cable core. Likewise, water-swellable components such as a yarn or tape may be placed around central member 151 for inhibiting water migration along the middle of cable 150. Other variations of cable 150 can include an armor tape, an inner jacket, and/or different numbers of tube assemblies.

Figure 19:
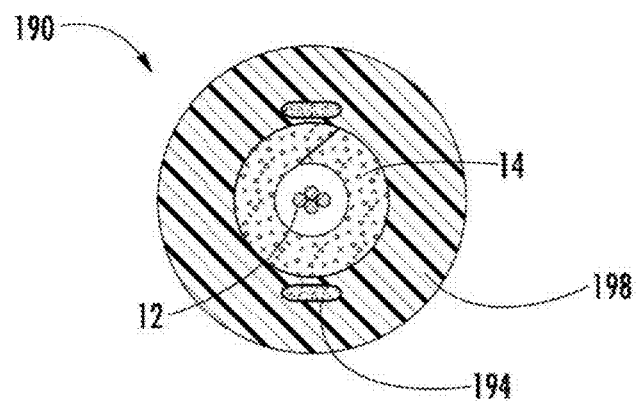
FIGS. 19 and 20 are cross-sectional views of tubeless fiber optic cables according to the present disclosure.
Figure 20:
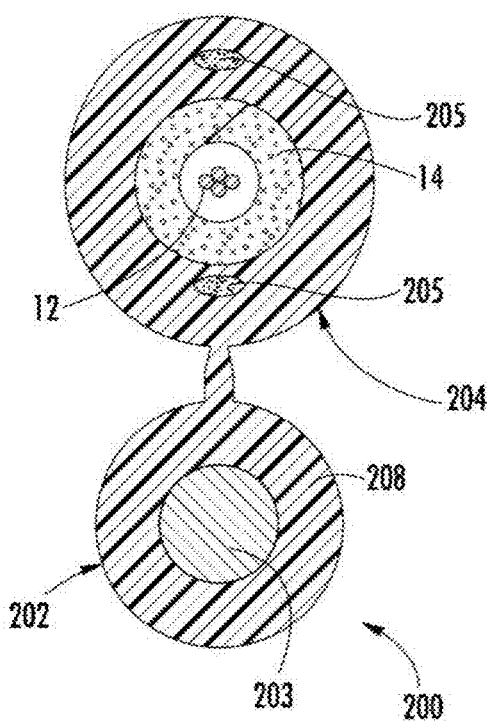

FIGS. 19 and 20 depict explanatory tubeless cable designs according to the present disclosure. Specifically, cable 190 is a drop cable having at least one optical waveguide 12 generally surrounded by dry insert 14 within a cavity of jacket 198. Cable 190 also includes at least one strength member 194. Other tubeless drop cable configurations are also possible such as round or oval configurations. FIG. 20 depicts a tubeless figure-eight drop cable 200 having a messenger section 202 and a carrier section 204 connected by a common jacket 208. Messenger section 202 includes a strength member 203 and carrier section 204 includes a cavity having at least one optical waveguide 12 that is generally surrounded by dry insert 14. Carrier section 204 can also include at least one anti-buckling member 205 therein for inhibiting shrinkage when carrier section 204 is separated from messenger section 202. Although, FIGS. 19 and 20 depict the dry insert of FIG. 4a any suitable dry insert may be used.

In other exemplary cable embodiments, a gel-free, or dry fiber optic ribbon cable may include an inducement to couple the ribbon stack to the buffer tube or jacket. An elongated tape may be employed inside the buffer tube or jacket, surrounding the ribbon stack to facilitate coupling and water blocking. By using, for example, such a tape wide enough to produce an overlapping portion around at least a portion of the ribbon stack, coupling may be induced due to the presence of at least three layers of tape over a portion of the inner circumference of the buffer tube or jacket. Previously, tape was, for example, of such a width relative to the tube size such that there was no overlap. Such coupling may be further enhanced by having a relatively large ratio of tube inner area to ribbon stack cross sectional area. Such enhanced coupling may be achieved without increasing attenuation across the optical fibers of the ribbon stack.

Figure 21:
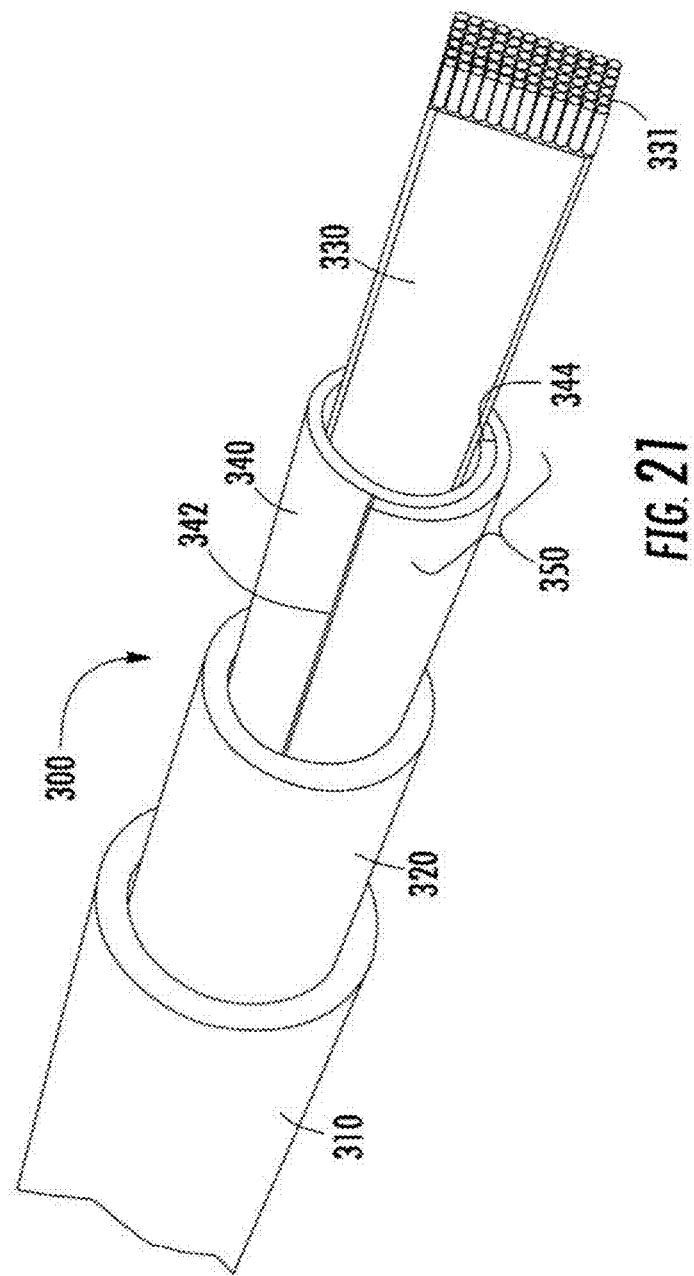
FIG. 21 is a perspective view of a fiber optic ribbon cable having an overlapping elongated tape.

FIG. 21 depicts an exemplary embodiment of a fiber optic ribbon cable 300 having a jacket 310, a buffer tube 320 disposed in jacket 310, a fiber optic ribbon stack 330 and an elongated tape 340 disposed about ribbon stack 330. Ribbon stack 330 extends longitudinally within buffer tube 320. In some embodiments, buffer tube 320 may not be present, leaving jacket 310 to function as both jacket and buffer tube. Elongated tape 340 may include two opposing edges. 342, 344. Elongated tape 330 may, in exemplary embodiments, extend along ribbon stack 330, wrapping around ribbon stack 330, for example, with at least a portion of one opposing edge 344 tucking between the other opposing edge 342 and ribbon stack 330, defining an overlapping portion 350. Ribbon stack 330 may be made from optical fiber ribbons 331, and may be oriented in a helical twist. Ribbon stack 330 may include up to 144 optical fibers, an in exemplary embodiments may have 72 optical fibers.

Figure 22:
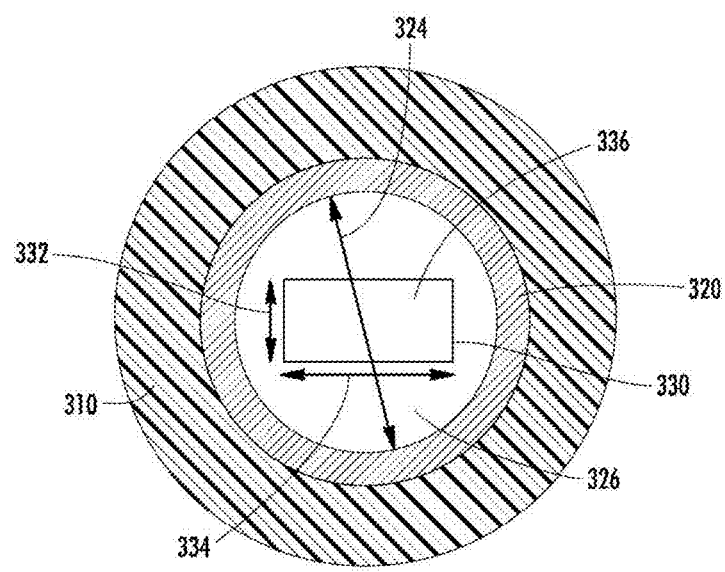
FIG. 22 is a cross sectional schematic view of the cable of FIG. 21.

As shown in FIG. 22, ribbon stack 330 has an average cross sectional ribbon area 336 defined by average stack height 332 and average stack width 334. In exemplary embodiments buffer tube 310 has an average cross sectional inner area 326 bounded by average inner perimeter 324, and defined by, for example, average inner width 322. Buffer tube 310 may in some embodiments define a generally circular profile, making the area calculation an application of the formula for the area of a circle, as known, having a diameter with the value of average inner width 322. In exemplary embodiments inner area 326 and ribbon area 336 define a ratio of about 0.30 or greater. In other words, ribbon area 336 may represent about 30% or more of inner area 326.

Figure 23:
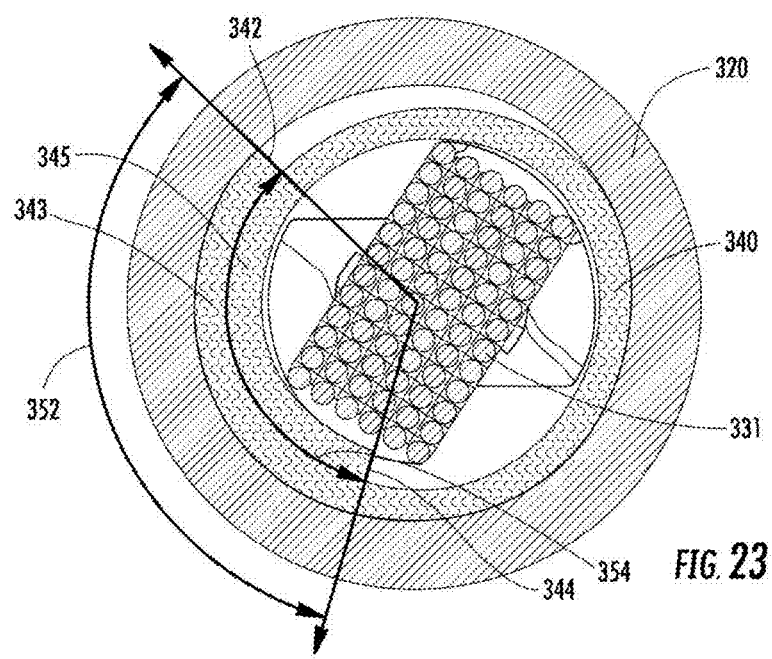
FIG. 23 is a cross sectional view of the cable of FIG. 21.

Elongated tape 340 may reside in the balance of inner area 326, as shown in FIG. 23, substantially surrounding ribbon stack 330. As stated above, elongated tape 340 may have two opposing edges 342, 344 that traverse the length of elongated tape 340. In exemplary embodiments overlapping portion 350 may be defined, for example by one edge, for example, edge 342, tucking beneath the other edge, for example, edge 344, sandwiching an outside layer 343 and a tucked in layer 345 of elongated tape 340 between buffer tube 320 and ribbon stack 330. Overlapping portion 350 may partially surround ribbon stack 330 as depicted by an angular overlap measurement 352, for example, of at least 45 degrees. In exemplary embodiments, overlap measurement 352 of overlapping portion 350 may be from about 90 degrees to about 180 degrees, and in yet other exemplary embodiments may be about 130 degrees.

An imaginary diametric line 362 traversing cable 300 and crossing overlapping portion 350 may encounter, for example, three layers 364, 366, 368 of elongated tape 340. Such overlapping may insure an adequate linear distance 354, shown in FIG. 24, of overlapping portion to provide a large range of three layer tape region 360, enhancing ribbon stack coupling. Linear distance 354 may be from about four millimeters to about six millimeters. As defined herein, an "overlap" need not be continuous or uniform along the entire length of ribbon cable 300. In exemplary embodiments, overlapping portion 350 may extend longitudinally along ribbon stack 330 for a distance of at least one meter.

Figure 25:
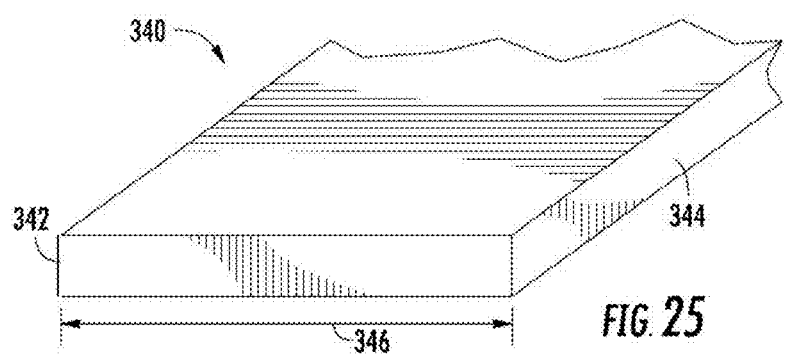
FIG. 25 is a partial perspective view of an elongated tape.

Shown in FIG. 25, elongated tape 340 may, in exemplary embodiments, be made from a nonwoven polyester material and include water blocking material, for example, superabsorbent polymer, though other materials may be contemplated. Elongated tape 340 may have a width 346 greater than 14 millimeters, and other embodiments may have a width in the range of about 18 millimeters to about 25 millimeters. In yet other exemplary embodiments elongated tape 340 may be from about 20 millimeters to about 22 millimeters. e.g., 21 millimeters. In exemplary embodiments, elongated tape 340 of ribbon cable 300 may not require the application of adhesives or glues.

Figure 26:
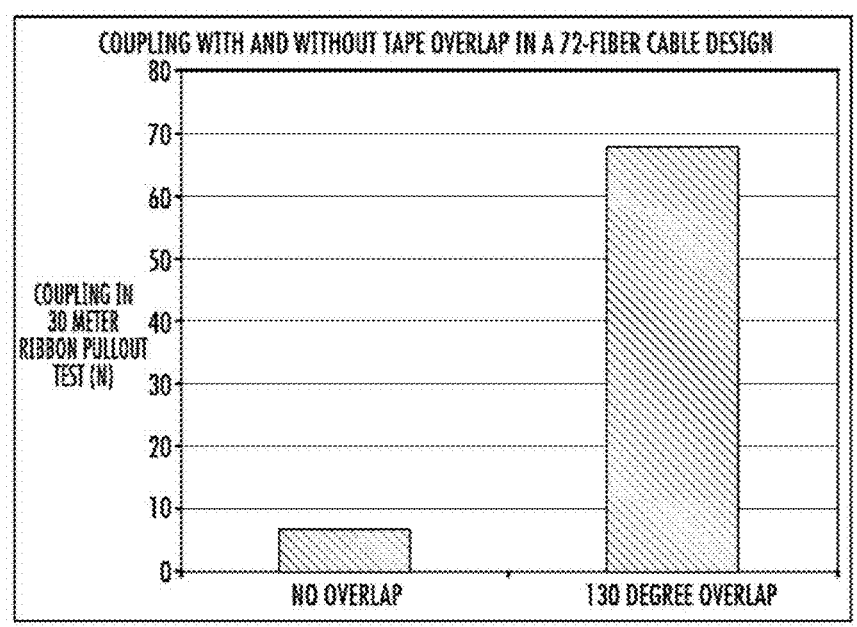
FIG. 26 is a graph showing coupling force of the cable of FIG. 21.

The presence of three layers 364, 366, 368 of elongated tape 340, enabled by overlapping portion 350, provides coupling of ribbon stack 330 relative to jacket 310 or buffer tube 320. Any attempted movement of ribbon stack 330 may be met by resistance from elongated tape 340, effectively binding ribbon stack 330 to the interior of jacket 310 or buffer tube 320. In addition to overlapping portion 350, elongated tape 340 may include other longitudinal features disposed along the length of the cable, for example, folds, wrinkles, creases, corrugations, quilting and combinations of the same, which may further enhance the coupling force of ribbon stack 330. In some embodiments, ribbon stack 330 may having a coupling force relative to jacket 310 or buffer tube 320 of greater than or equal to 0.39 Newtons per meter (N/m) for a 30 meter length of ribbon cable 300. This provides for 0.1625 Newtons per fiber per 30 meters of cable length. In other embodiments, the coupling force may be from about 1.67 N/m to about 2.66 N/m for a 30 meter length of ribbon cable 300. In yet other embodiments, the coupling force may be from about 2.0 N/m to about 2.33 N/m for a 30 meter length of ribbon cable 300. In exemplary embodiments, the coupling force may be about 2.25 N/m for a 30 meter length of ribbon cable 300. In other words, ribbon stack 330, having, for example, 72 fibers, may have a coupling force of about 68 Newtons. As shown in FIG. 26, a 72 fiber cable not having overlapping portion 350 has a coupling force of about 7 Newtons, which may be stated to be 0.0972 Newtons per fiber over a 30 meter length of cable, or only about 60% of a minimum provided by overlapping portion 350.

In exemplary embodiments, ribbon cable 300 may further include an armor layer disposed between buffer tube 320 and the jacket 310. The armor layer (not shown) may be a dielectric armor layer or a metallic armor layer.

A method of manufacturing ribbon cable 300 may be referenced above, and in FIG. 6. In addition to the procedures above, the method may also include the step of paying off a plurality of optical fiber ribbons, forming ribbon stack 330. In exemplary embodiments, the method may include paying off at least one elongated tape 340, placing elongated tape 340 around the plurality of optical fiber ribbons so that the elongated tape overlaps on itself, forming overlapping portion 350, the overlapping portion at least partially surrounding the plurality of optical fiber ribbons, forming a core. Buffer tube 320, for example, may be extruded around the core. Jacket 310 may be extruded around buffer tube 320.

Coupling force may be induced in fiber optic ribbon cable 300. For example, when buffer tube 320 is around the core, buffer tube 320 may be, for example, a polymer extruded in a molten state. By cooling buffer tube 320, buffer tube 320 may contract around the core, inducing the coupling force between the ribbon stack, the elongated tape, the overlapping portion and the buffer tube of about 0.39 N/m or greater for a 30 meter length of cable.

Figure 24:
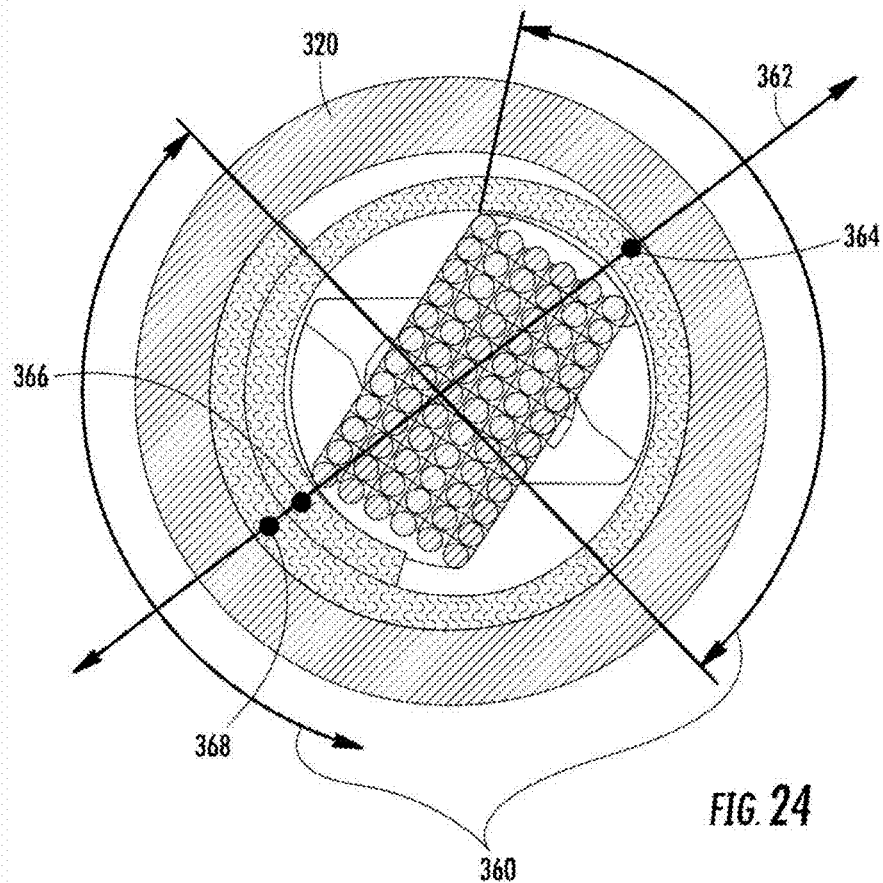
FIG. 24 is another cross sectional view of the cable of FIG. 21.

Advantages of above-described embodiments include the ability to change or "tune" the coupling force by adjusting the amount of the overlap of the tape or by changing the twist lay of the stack of ribbons. For example, as shown in FIGS. 21, 23, and 24, in at least some of the above-described embodiments, the corners of a rectangular stack of ribbons form the outermost projections of the ribbon stack and thereby contact the tape and provide some or all of the coupling force via interaction with the tape (e.g., compression of the tape(s) by the corners of the stack). With the stack twisted, the corners of the stack only contact the overlapping tape section within the tube at intermittent locations along the length of the cable, thereby providing intermittent coupling points or portions; where, between the points or portions of intermittent coupling, the stack of ribbons may be less coupled or not directly coupled at all to the tube, allowing greater freedom of ribbon movement when compared to the intermittent coupling points or portions. As such, increasing the twist rate (i.e., decreasing the lay length of the stack) increases the number of intermittent coupling points or portions between the stack and the overlapping portion of the tape, thereby increasing the overall coupling and pull-out force. Alternatively, or in addition thereto, increasing the amount of overlap of tape (e.g., 130-degrees of the interior of the tube, as opposed to just 45-degrees of overlap) accordingly increases the length that the corners of the ribbon stack, twisting within the tube relative to the overlap, contact or interface with the overlap at each respective intermittent coupling point or portion, thereby correspondingly increasing the coupling force. Coupling may be increased by changing other parameters as well, such as by decreasing the tube diameter (influencing the ratio of stack-to-inner-tube-area), increasing the ribbon stack size (influencing the ratio of stack-to-inner-tube-area), increasing the tape thickness, and by adjusting or changing other parameters; and the opposite may be true as well, that coupling force between the ribbon stack and the tube by way of the tape may be reduced by reversing such parameters. With that said, increasing the amount of tape overlap and/or increasing the rate of twist in the ribbon stack (i.e., decreasing the lay length) are two relatively simple ways to "tune" the coupling force, so as to achieve the desired coupling and/or a coupling force within the ranges disclosed above (or other coupling forces).

Many modifications and other embodiments of the present disclosure, within the scope of the appended claims, will become apparent to a skilled artisan. For example, optical waveguides can be formed in a variety of ribbon stacks or configurations such as a stepped profile of the ribbon stack. Cables according to the present disclosure can also include more than one optical tube assembly stranded helically, rather than S-Z stranded configurations. Additionally, dry inserts of the present disclosure can be laminated together as shown or applied as individual components. Therefore, it is to be understood that the disclosure is not limited to the specific embodiments disclosed herein and that modifications and other embodiments may be made within the scope of the appended claims. Although specific terms are employed herein, they are used in a generic and descriptive sense only and not for purposes of limitation. The disclosure has been described with reference to silica-based optical waveguides, but the inventive concepts of the present disclosure are applicable to other suitable optical waveguides and/or cable configurations.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of manufacturing a fiber optic cable, the method comprising:

arranging a plurality of optical waveguides in a ribbon stack; and surrounding the ribbon stack with a dry insert, the dry insert comprising a layer of foam material; and extruding a jacket around the dry insert, wherein corners of the ribbon stack interface with the dry insert to define a coupling extending longitudinally between the ribbon stack and the jacket.

2. The method of claim 1, further comprising:

paying off at least one strength member prior to extruding the jacket such that the jacket is extruded about the at least one strength member.

3. The method of claim 1, further comprising:

extruding a buffer tube prior to extruding the jacket such that the jacket is extruded about the buffer tube.

4. The method of claim 1, wherein the dry insert comprises a second layer surrounding the layer of foam material.

5. The method of claim 4, wherein the second layer is a water-swellable tape.

6. The method of claim 1, wherein the foam material is a closed-cell foam.

7. The method of claim 6, wherein the closed-cell foam has at least one perforation therethrough.

8. The method of claim 7, wherein the closed-cell foam includes at least one water-swellable substance such that the closed-cell foam acts as a passive water-blocking material that inhibits water from migrating therealong and the perforation allows an activated water-swellable substance to migrate radially inward towards the plurality of optical waveguides.

9. The method of claim 1, wherein the plurality of optical waveguides includes at least one single-mode optical fiber.

10. The method of claim 1, wherein the ribbon stack comprises 72 optical fibers.

* * * * *